United States Patent [19]
Bose et al.

[11] Patent Number: 4,713,594
[45] Date of Patent: Dec. 15, 1987

[54] START-UP CONTROL FOR SWITCHED RELUCTANCE MOTOR

[75] Inventors: Bimal K. Bose, Latham; Paul M. Szczesny, Burnt Hills, both of N.Y.

[73] Assignee: General Electric Company, Schenectady, N.Y.

[21] Appl. No.: 915,291

[22] Filed: Oct. 3, 1986

[51] Int. Cl.$^4$ .............................................. G05B 19/40
[52] U.S. Cl. ...................................... 318/685; 318/696
[58] Field of Search ............... 318/696, 685, 138, 254, 318/561

[56] References Cited

U.S. PATENT DOCUMENTS

| | | | |
|---|---|---|---|
| 4,228,387 | 10/1980 | Brown | 318/696 |
| 4,253,053 | 2/1981 | Ray et al. | 318/701 |
| 4,471,278 | 9/1984 | Matonka | 318/561 |
| 4,500,824 | 2/1985 | Miller | 318/701 |
| 4,611,157 | 9/1986 | Miller et al. | 318/696 |

OTHER PUBLICATIONS

B. K. Bose et al., "Microcomputer Control of Switched Reluctance Motor", Paper Presented at IEEE/IAS Annual Meeting, Toronto, Canada, Oct. 7, 1985.

B. K. Bose, "Control System for Switched Reluctance Motor", Application Ser. No. 915,288, filed Oct. 3, 1986.

Miyamoto et al., "A Microprocessor-Based Time Optimal Control of a Variable-Relucatance Step Motor", IEEE Trans. on Industrial Electronics, IE-29, No. 3, Aug. 1982, pp. 190-196.

Primary Examiner—William M. Shoop, Jr.
Assistant Examiner—Saul M. Bergmann
Attorney, Agent, or Firm—Marvin Snyder; James C. Davis, Jr.

[57] ABSTRACT

A start-up control for a switched reluctance motor employs an encloder for generating a rotor position information signal for each stator phase and a start-up signal processor. The processor receives the rotor position information signals and processes them in accordance with a direction command. To initiate forward rotation, the information signals are complemented; to initiate reverse rotation, the information signals for adjacent phases are AND-coupled.

16 Claims, 13 Drawing Figures

FORWARD START-UP CURRENT

REVERSE START-UP CURRENT

START-UP CONTROL FOR SWITCHED RELUCTANCE MOTOR

BACKGROUND OF THE INVENTION

This invention relates generally to motor controls and more specifically to a start-up control for a switched reluctance motor.

Although they have been known for some time, interest in switched reluctance motor (SRM) drives has recently revived. Compared to conventional induction and synchronous motor drive systems, the SRM drive is simple in construction and economical. In addition, the converter which supplies power to the SRM machine requires fewer power devices and, therefore, is more economical and reliable. In view of these advantages, the switched reluctance motor drive system provides an attractive alternative to conventional drive systems and is expected to find wide popularity in industrial applications.

Switched reluctance motors conventionally have multiple poles or teeth on both the stator and rotor (i.e. doubly salient). There are phase windings on the stator but no windings on the rotor. Each pair of diametrically opposite stator poles is connected in series to form one phase of the multiphase switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow so that unidirectional current pulses synchronized with rotor movement can be applied by a converter using unidirectional current switching elements such as thyristors or transistors.

In operation, each time a phase of the switched reluctance motor is switched on by closing a switch in a converter, current flows in the stator winding of that phase, providing energy from a DC supply to the motor. The energy drawn from the supply is converted partly into mechanical energy by causing the rotor to rotate toward a minimum reluctance configuration and partly into stored energy associated with the magnetic field. After the switch is opened, part of the stored magnetic energy is converted to mechanical output and part of the energy is returned to the DC source.

The control requirements of the SRM drive are so unique that concepts of induction and synchronous type machines can hardly be extrapolated to the SRM. Previously, SRM drives, in running condition, were controlled open loop with angle and current amplitude regulation by manual adjustment, and the controls usually employed discrete components and dedicated hardware. Such prior control systems were often bulky, complex, expensive, limited in mode of operation, and hardware intensive. Although suitable for laboratory tests, they did not readily lend themselves to industrial application.

Recently, a programmable, closed-loop, four-quadrant control system incorporating feedback control, angle control and current control has been developed. This new control system is described in a paper entitled "Microcomputer Control of Switched Reluctance Motor" by B. K. Bose et al., published in the Conference Record of the October 1985 IEEE Industrial Application Society Annual Meeting and is the subject of commonly assigned, co-pending U.S. patent application Ser. No. 915,288 filed concurrently herewith. The paper, which appears at pages 542-547 of the 1985 Annual Meeting Conference Record is incorporated herein by reference, for background purposes.

The present invention relates to a start-up control which can advantageously be employed with the overall control system described in the above-mentioned paper. A switched reluctance motor, unlike an induction motor, is not easy to start. If current pulses are applied in sequence to the stator windings at any arbitrary position of the rotor, the SRM may randomly start either in forward or reverse direction. In the past, switched reluctance motors have been started with complex, discrete digital logic circuits from signals provided by a rotor position encoder. The starting technique was unreliable and could not set automatically the direction of motion. Further, the prior start-up systems were unable to smoothly transition to a feedback mode because in the past the drive control was designed to operate in open-loop condition.

A need thus exists for a start-up control for a switched reluctance motor which overcomes the drawbacks of present-day designs, is compatible with a feedback control system, and facilitates use of the switched reluctance motor for general purpose industrial applications.

SUMMARY OF THE INVENTION

Briefly, this need is satisfied in accordance with the present invention by a start-up control which allows rotor rotation to be initiated in either a forward or reverse direction, as commanded, from any initial arbitrary rotor position, with a programmable magnitude of starting torque. The start-up control also ensures smooth transition to a feedback control mode. The start-up control can be readily implemented with a microcomputer providing simplicity, accuracy and substantial hardware simplification.

According to one aspect of the present invention, the start-up control comprises an optical rotor position encoder and a start-up signal processor. The start-up signal processor receives and processes logic signals from the encoder and a direction command signal to generate phase correlated start-up current pulses which are synchronized with rotor position. The processor complements the logic signals from the encoder to determine which stator pole pair(s) to fire (i.e., energize) to initiate forward direction rotation and AND-couples pair(s) of adjacent logic signals to determine which stator pole pairs to fire to initiate reverse direction rotation.

In accordance with a method of the present invention, a multi-phase switched reluctance motor is started by correlating initial rotor position with the slope of the inductance profile of each stator pole pair, and firing only stator pole pairs whose inductance profile has a positive slope, in the command direction, at initial rotor position.

Accordingly, it is a principal object of the present invention to provide a new and improved method and apparatus for starting a switched reluctance motor which overcomes the drawbacks of prior start-up systems and facilitates industrial application of the SRM.

Another object of the present invention is to provide an SRM start-up control which permits startup in either forward or reverse direction with programmable magnitude of torque and smooth transition to a feedback control mode.

A further object of the present invention is to provide an SRM start-up control which is simple and inexpensive to implement, yet highly accurate and predictable in performance.

Yet another object of the present invention is to provide a start-up system which optimizes SRM performance in a start-up mode and facilitates transition between the start-up mode and a feedback mode.

A still further object is to provide an SRM start-up control which can be readily implemented using a microcomputer and which is compatible with a programmable, closed-loop, four-quadrant SRM control system.

Yet another object of the present invention is to provide a start-up control which, in conjunction with a programmable, closed-loop, four-quadrant control system, improves the operational characteristics of switched reluctance motors and extends their applicability.

BRIEF DESCRIPTION OF THE DRAWINGS

The foregoing and other objects, features and advantages of the present invention will be apparent from the following detailed description of the invention when read in conjunction with accompanying drawings in which:

FIG. 1a is a cross-sectional view of a typical switched reluctance motor;

FIG. 1b illustrates a typical power converter for the switched reluctance motor of FIG. 1a;

FIG. 2a profiles inductance with respect to rotor angular position for a stator pole pair of the motor of FIG. 1a;

FIGS. 2b and 2c illustrate typical stator phase start-up pulses for forward direction rotation and reverse direction rotation, respectively, and are helpful in understanding the relationship of these pulses to the inductance profile of FIG. 2a;

DETAILED DESCRIPTION OF THE INVENTION

The start-up control of the present invention will now be described in connection with a four-phase switched reluctance motor 10 illustrated in FIG. 1a and the associated power converter 20, shown in FIG. 1b. It should be understood that this motor/converter configuration is merely representative, and that the start-up control of the present invention is applicable to any SRM.

Figures 1A, 1B:
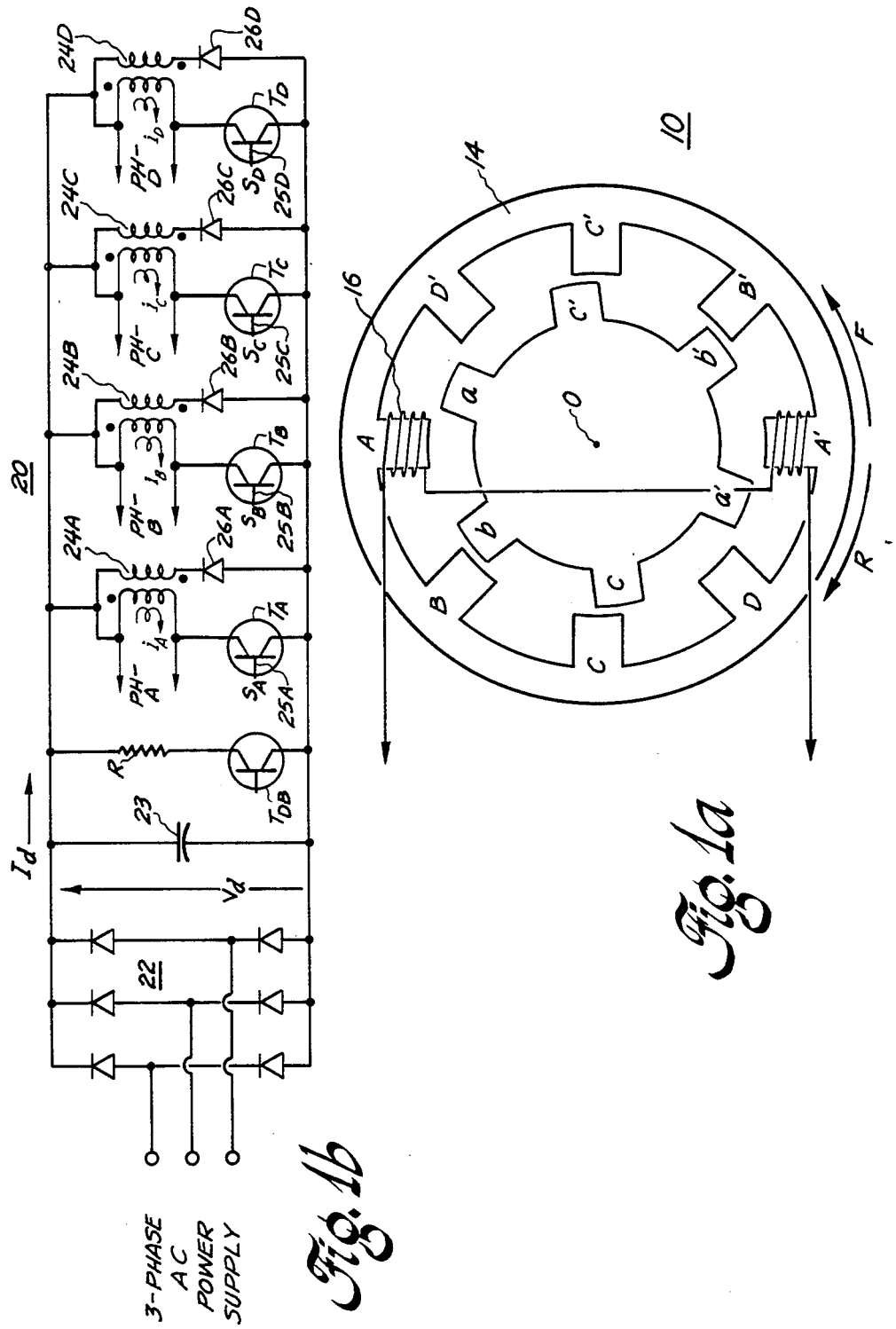

As shown in FIG. 1a, motor 10 includes a rotor 12 rotatable in either a forward or reverse direction within a stationary stator 14. As illustrated, the forward direction F indicates counterclockwise rotation of the rotor while the reverse direction R indicates clockwise rotation. Rotor 12 has three pairs of diametrically opposite poles a—a', b—b' and c—c'. Stator 14 is provided with four pairs of diametrically opposite stator poles A—A', B—B', C—C' and D—D'. In the illustrated embodiment, each rotor pole and each stator pole has an angular extent of 18 degrees. The gap between adjacent rotor poles in the illustrated embodiment is 42 degrees while the gap between adjacent stator poles is 27 degrees. These angles are measured about a central axis of rotation passing through point 0.

The opposite poles of each stator pole pair share a common bifilar winding and define a respective stator phase. A representative winding coil 16 for phase A is illustrated in FIG. 1a. Similar windings are provided for each of the stator pole pairs.

Rotor rotation is initiated and maintained by switching current on and off in each stator phase winding in a predetermined sequence synchronized with angular position of the rotor. Current in each stator phase is derived from power converter 20 of FIG. 1b, which impresses a DC link voltage $V_d$ across the four parallel stator phase legs PH-A, PH-B, PH-C and PH-D. Link voltage $V_d$ can be obtained from a battery (not shown), or from an AC power supply (e.g. a three-phase, 220 volt, 60 Hz line) through a conventional diode rectifier circuit 22 and filtering capacitor 23.

The converter circuitry for each stator phase leg is identical. The PH-A leg, for example, includes stator bifilar winding 24A, a feedback diode 26A and a current switching device, e.g. transistor $T_A$, interconnected as shown in FIG. 1b. As will be more fully explained hereinafter, base 25A of transistor $T_A$ is connected to an output of the start-up system of the present invention and receives a switching control pulsetrain $S_A$ therefrom.

When transistor $T_A$ is switched on, a phase current $i_A$, derived from link current $I_d$, flows through the stator winding for phase A. When transistor $T_A$ is switched off, bifilar winding 24A in series with feedback diode 26A returns stored energy to the source. A dynamic brake transistor $T_{DB}$ in series with a resistor R across the rectified AC source can be switched on to dissipate recovered energy in resistor R. Alternatively, with a battery power supply, the energy is absorbed by the power supply.

The converter circuitry for each of the other phase legs operates identically and accordingly is not detailed herein. Transistors $T_A$, $T_B$, $T_C$ and $T_D$ are made to conduct in sequence, with the order of conduction depending upon the desired direction of rotation. In the embodiment illustrated, a particular phase is fired periodically with a 60 degree cycle period and, therefore, for the four-phase machine, consecutive phases are fired at 15 degree intervals.

Figure 2A:
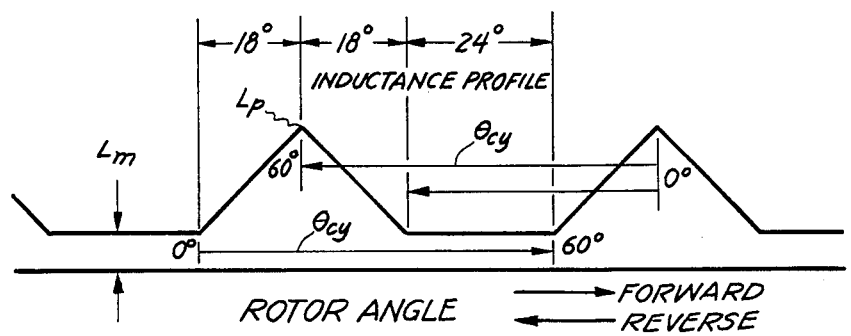
Figure 2B:
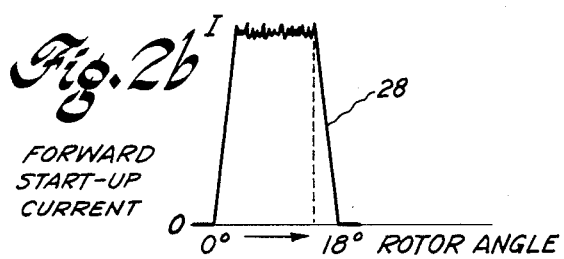
Figure 2C:
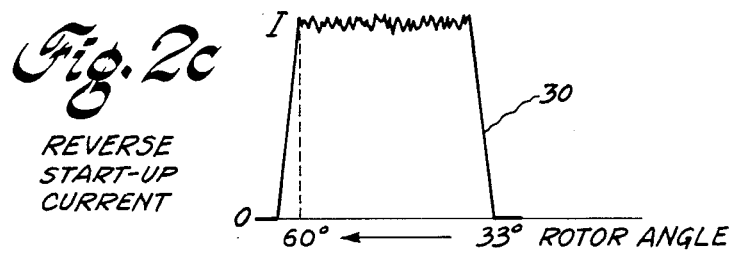

The waveshape and timing of stator phase start-up current pulses for different directions with respect to inductance profile will now be explained. The inductance profile of a stator pole pair (e.g. phase A) with respect to rotor angular position is shown in FIG. 2a, while typical stator phase start-up current pulses for forward and reverse directions, with respect to rotor angular position, are illustrated in FIGS. 2b and 2c, respectively. The inductance profile has a cycle period $\theta_{cy}=60°$ and the distribution of rising inductance, falling inductance and minimum inductance periods, for both forward and reverse direction rotations and reference frames, is shown in FIG. 2a. For forward rotation, the inductance increases for the first 18 degrees. At 18°, a rotor pole is aligned with the stator pole and peak inductance $L_p$ is achieved. From 18° to 36° the inductance falls and for the next 24 degrees remains at a minimum inductance $L_m$, then the cycle repeats. For reverse rotation, the inductarce falls from 0° to 18°, remains at a minimum inductance $L_m$ from 18° to 42° and then rises to the peak inductance $L_p$ from 42° to 60°.

Referring now to both FIGS. 2a and 2b, it will be seen that for start-up in a forward direction, the stator current pulse 28 is established where the inductance profile has a positive slope. This is because the instantaneous motor torque $T_e$ is given by the relation $$T_e = \tfrac{1}{2} i^2 m \tag{1}$$

where i is the instantaneous current and m is the inductance slope. In accordance with equation (1) and as shown in FIG. 2c, for start-up in the reverse direction, current pulse 30 occurs during a negative slope of the inductance profile, which appears as a positive slope in the reverse direction. As explained subsequently, pulse 30 may partially overlap the minimum inductance region with little adverse effect. The current magnitude I for either forward or reverse start-up is maintained substantially constant by a chopping or bang-bang control, described more fully hereinafter.

The inductance profiles for the other stator phases of the SRM are identical to that shown in FIG. 2a for phase PH-A, except that they are mutually phase-shifted by 15 degrees. For any arbitrary rotor position, the inductance profile of at least one stator phase will have a positive slope in the forward direction. The same will be true for at least one other stator phase in the reverse direction. In accordance with the present invention, rotor rotation in a commanded direction is initiated by firing the stator phase(s) whose inductance profile has a positive slope in the commanded direction, at the initial rotor position and at subsequent instantaneous rotor positions in the start-up mode.

Examples of apparatus for implementing the start-up method of the present invention will be described hereinafter, but an overall control system in which the present invention can be advantageously employed will first be discussed. A full SRM control system is depicted in simplified functional block diagram form in FIG. 3. The basic system includes feedback control 44, angle control 46 and current control 48. In addition, start-up control 50 of the present invention, an absolute rotor position encoder 52, an incremental position encoder 54 and a speed calculator 56 are shown.

Figure 3:
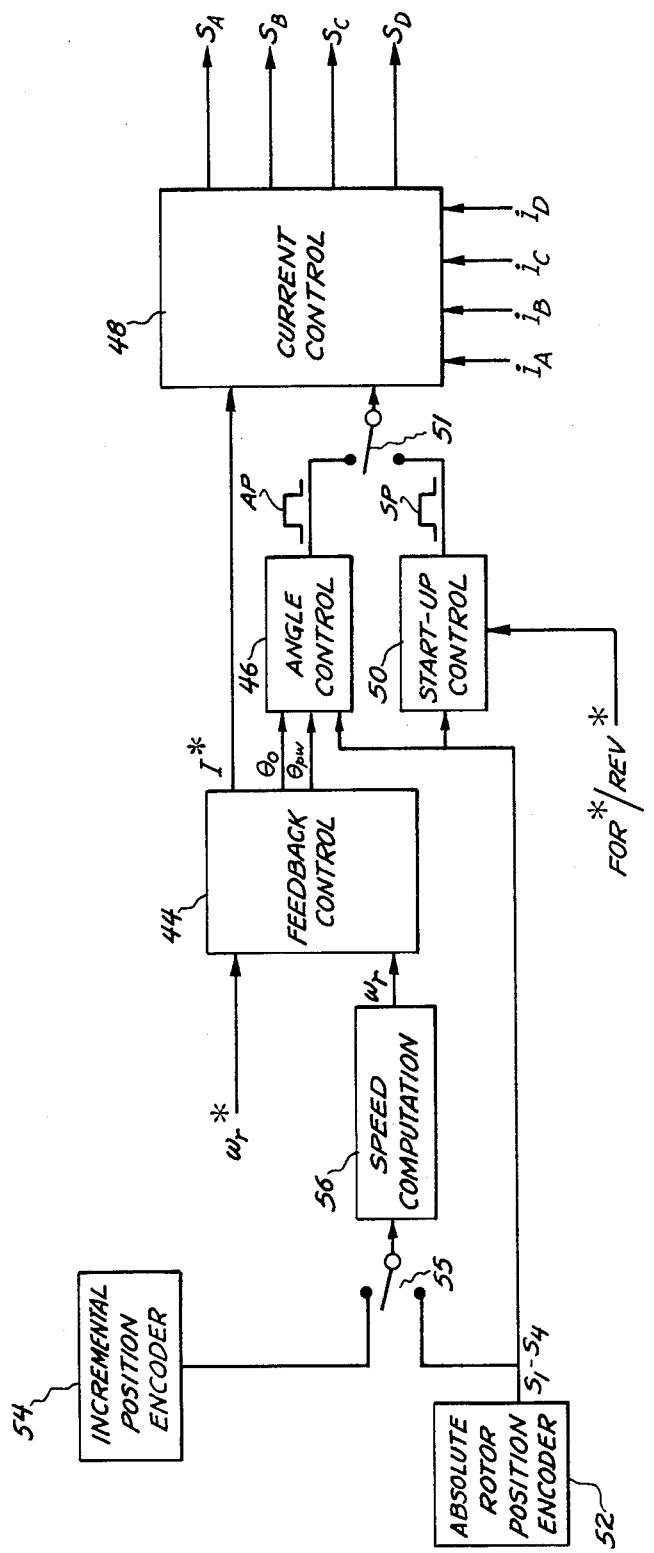
FIG. 3 is a simplified functional block diagram of an SRM control system in which the start-up control of the present invention is especially useful.

Feedback control 44 may comprise a speed loop, a torque loop, or a speed with inner torque feedback loop. As an example, FIG. 3 illustrates use of a speed loop.

The feedback control receives an operator command, e.g. speed command $\omega_r^*$ as illustrated (or torque command $T_e^*$), and an actual speed signal $\omega_r$ from speed calculator 56. The closed loop feedback control processes the operator command and the actual speed signal to generate a current command $I^*$, a turn-on angle signal $\theta_o$, and a pulsewidth angle signal $\theta_{pw}$. The values of the turn-on angle and pulsewidth angle signals are preferably independently programmable for different quadrants of operation (i.e. forward motoring, forward braking, reverse motoring and reverse braking).

Angle control 46 receives the turn-on angle signal and the pulsewidth angle signal from feedback control 44, and rotor position information signals $S_1$, $S_2$, $S_3$ and $S_4$ from encoder 52. The angle control digitally processes these signals to provide mutually phase-shifted pulsetrains AP for the different stator phases, each pulsetrain comprising conduction angle pulses synchronized with the rotor position and coordinated with an inductance profile of the motor in accordance with the selected quadrant of motor operation. The angle control is preferably implemented with a phase-locked loop and pairs of independently programmable delay and pulsewidth counters, as shown in detail in FIGS. 11 and 12 of the aforementioned application Ser. No. 915,288.

Current control 48 receives a current command $I^*$ from feedback control 44, actual current $i_A$, $i_B$, $i_C$ and $i_D$ for each stator phase, and pulsetrains AP from angle control 46. The current control processes these signals to provide switching control signals $S_A$, $S_B$, $S_C$ and $S_D$ to the bases of transistors $T_A$, $T_B$, $T_C$ and $T_D$, respectively, shown in FIG. 1b. The current control preferably operates on a bang-bang control principle and serves to maintain amplitude of actual current in each stator phase within the hysteresis band of the current command, up to a base motor speed, and limits peak amplitude of actual current in each stator phase to the maximum value of the hysteresis band beyond the base speed. A particular implementation of the current control is described hereinafter in conjunction with FIG. 8.

The feedback, angle and current controls, described above, ensure programmable, closed loop, four-quadrant control of the SRM in running condition. To initiate rotor rotation and bring the motor up to operating speed, start-up control 50 of the present invention is provided. As indicated generally in FIG. 3, the start-up control receives rotor position encoder signals $S_1$–$S_4$ and a direction command FOR*/REV*, and generates start-up stator current pulses SP. The start-up pulses are provided to current control 48 during the start-up mode. Upon transition to the feedback control mode, a switch 51 terminates the supply of pulses SP to current control 48 from start-up control 50, and instead supplies pulses AP to current control 48 from angle control 46. Switch 51 is typically implemented in microprocessor software in a manner well known to those skilled in the art.

Absolute rotor position encoder 52 provides position information signals $S_1$–$S_4$, indicative of instantaneous rotor position, for pulse synchronization purposes, to angle control 46 and start-up control 50. The same rotor position information signals can advantageously be processed by speed calculator 56 to generate the actual speed signal $\omega_r$. Although encoder 52 may take one of several different forms, it is preferably an optical encoder such as that described hereinafter with respect to FIGS. 4 and 5. Similarly, the computation of actual speed can be implemented in Various ways; in a preferred approach, angle control 46 derives the speed signal from a multiphase sync pulsetrain which, in turn, is derived from the encoder signals. At lower speeds, it may be desirable to employ an incremental position encoder 54 providing a high number of pulses at low speed, such as a Teledyne sensor model number 8625-600-042-10 available from the Teledyne Company, instead of absolute encoder 52. A switch 55 facilitates selection of the desired encoder.

In operation, the overall control system receives speed and direction commands from an operator and produces switching control signals for each stator phase, which signals are synchronized with rotor position. With such control system, the magnitude and turn-on ard turn-off angles of stator current pulses for each phase, in feedback mode, are controlled so as to provide smooth operation and full torque and speed range with optimum performance in all four quadrants of SRM operation. The start-up control of the present invention allows SRM start-up in either the forward or reverse direction, as commanded, with programmable magnitude of torque and smooth transition to the feedback control mode.

Particular apparatus for implementing the start-up control of the present invention will now be described. However, it will be appreciated by those skilled in this art that the invention may be implemented using other hardware.

Figure 4:
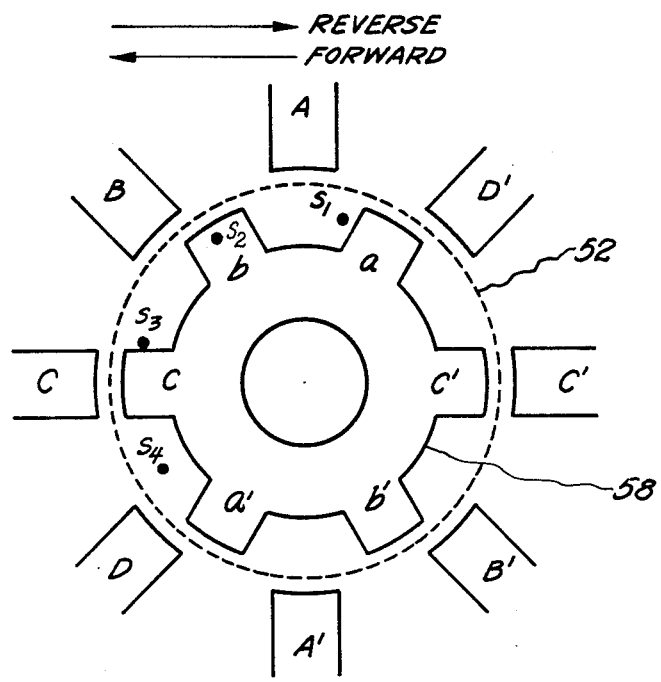
FIG. 4 is a simplified end view of an SRM showing a rotor position encoder useful in the present invention.

As mentioned earlier, the SRM is provided with an absolute rotor position encoder. As shown in the end view of FIG. 4, encoder 52 preferably comprises four optical sensors $s_1$, $s_2$, $s_3$ and $s_4$ and an interrupting type disk 58. Disk 58 has the same exterior profile as the rotor, and is aligned and mounted to rotate therewith. The sensors are mounted at the farthest clockwise edge of each respective stator pole pair, i.e. sensor $s_1$ at the farthest clockwise edge of pole A, $s_2$ at the farthest clockwise edge of pole B, $s_3$ at the farthest clockwise edge of pole C and $s_4$ at the farthest clockwise edge of pole D, as shown in FIG. 4.

Figure 5:
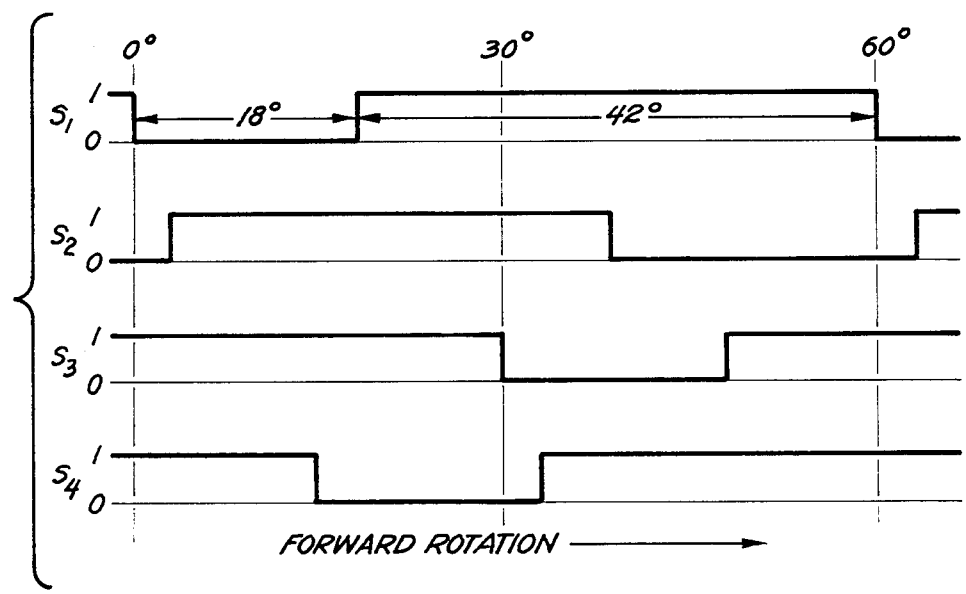
FIG. 5 illustrates logic signal waveforms derived from the rotor position encoder of FIG. 4 for forward rotation.

FIG. 5 shows the logic output waveforms from the optical sensors for forward rotation. Signals $S_1$, $S_2$, $S_3$ and $S_4$ represent the outputs of sensors $s_1$, $s_2$, $s_3$ and $s_4$, respectively. Each signal has a logic 0 value when optical energy impinging on the sensor generating the respective signal is interrupted by disk 58 and a logic 1 value when such optical energy is uninterrupted. As shown, the signals are mutually phase-shifted by 15 degrees.

As mentioned earlier, for start-up in the forward direction, it is necessary to determine which stator phase(s) have a positive slope to their inductance profile at the initial rotor position. As shown by way of example in FIG. 2a, stator phase PH-A has a positive slope to its inductance profile between 0° and 18° rotor angle, i.e. when the associated sensor, is interrupted by the rotor. Accordingly, the transistor base firing for a particular phase is established when the associated sensor output signal has a logic 0 value, as shown in FIG. 5. To implement this approach, the position sensor signals are sensed and complemented to determine which stator phase(s) to fire to initiate forward direction rotation. As indicated in FIG. 5, at any particular instant either one or two phases may contribute starting torque.

For reverse direction starting, the current pulse has to occur during the negative slope of the inductance profile, which is the positive slope for the reverse direction. In accordance with the present invention, the logic signals for reverse starting are generated by AND-coupling adjacent sensor signals. This generates 33°-60° pulsewidths instead of the optimum 42°-60° duration. Although the excess nine degrees causes some additional power dissipation, that can be ignored, considering the short duration for starting.

Figure 6:
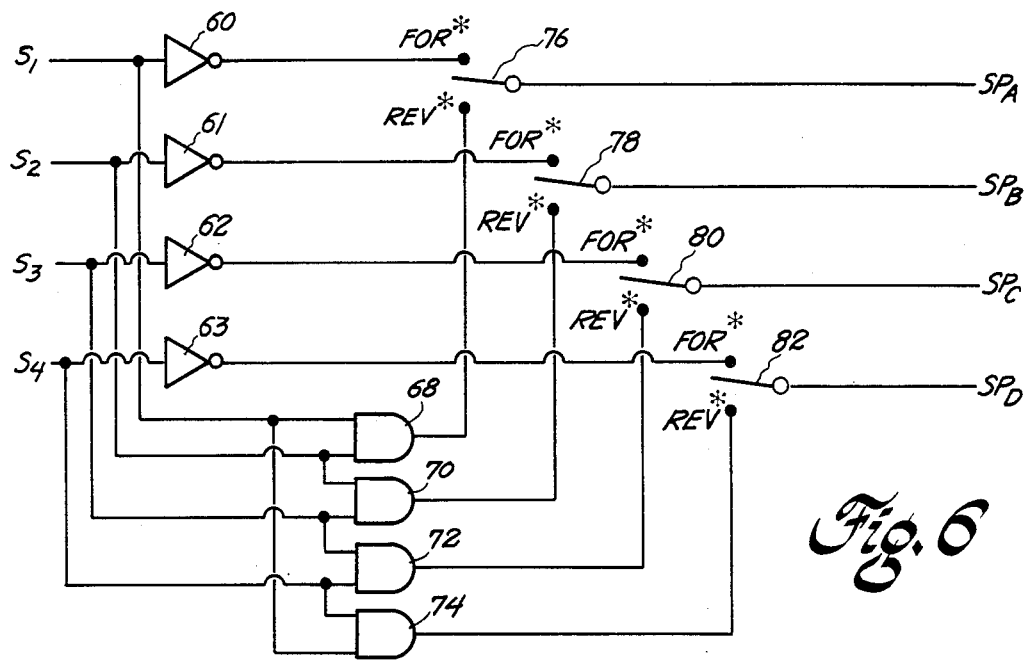
FIG. 6 shows an embodiment of a start-up signal processor of the present invention.

FIG. 6 illustrates a dedicated hardware implementation for the start-up method of the present invention. As shown, inverters 60, 62, 64 and 66 complement signals $S_1$, $S_2$, $S_3$ and $S_4$, respectively, to provide the start-up pulses for forward rotation. AND gates 68, 70, 72 and 74 AND-couple signals $S_1$ and $S_2$, $S_2$ and $S_3$, $S_3$ and $S_4$, and $S_4$ and $S_1$, respectively, to generate start-up pulses for reverse rotation. Switches 76, 78, 80 and 82 coordinate the outputs of the logic circuitry with the commanded direction to provide start-up pulses $SP_A$, $SP_B$, $SP_C$ and $SP_D$ for phases PH-A, PH-B, PH-C and PH-D, respectively. These start-up pulses are provided to the current control, as more fully described hereinafter.

Figure 7:
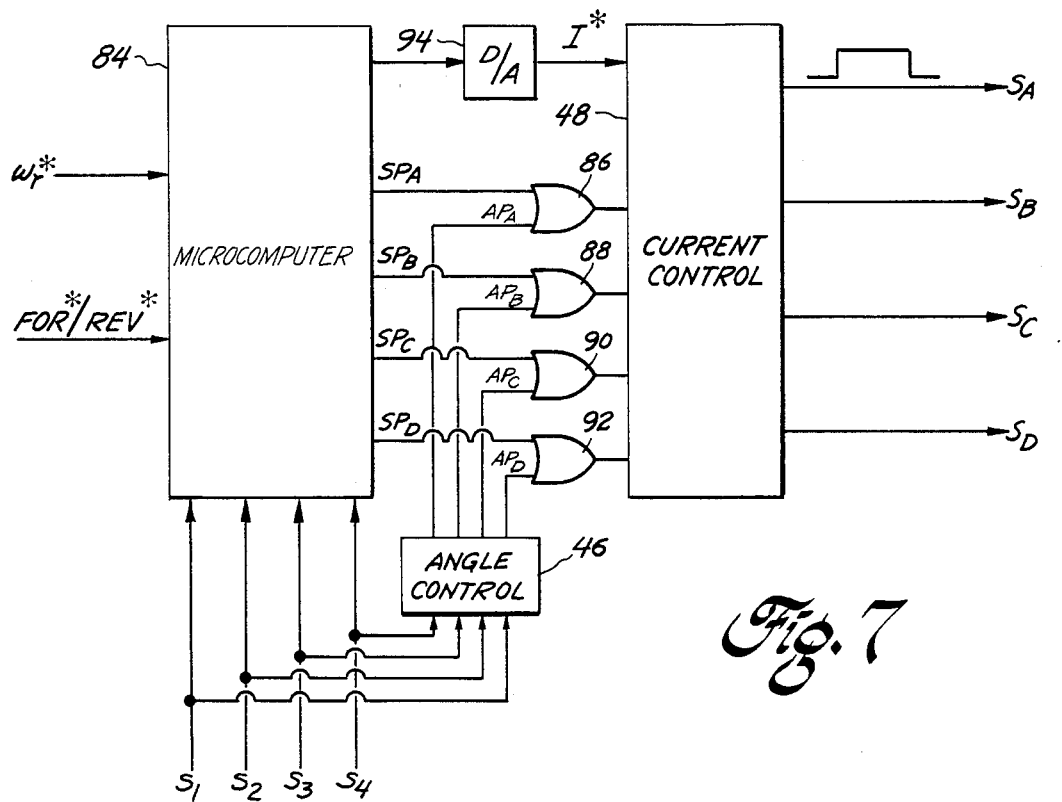
FIG. 7 is a block diagram illustrating another embodiment of a start-up signal processor of the present invention and its interconnection with an overall control system.

FIG. 7 is a hardware block diagram of a preferred microcomputer-based implementation of the start-up control of the present invention. Microcomputer 84 is provided with a speed command $\omega_r^*$, a direction command FOR*/REV* and sensor output signals $S_1$, $S_2$, $S_3$ and $S_4$. For forward start-up condition, the microcomputer senses the logic states of the $S_1$–$S_4$ signals, complements them and loads start-up signals $SP_A$, $SP_B$, $SP_C$ and $SP_D$ to current control 48 through OR gates 86, 88, 90 and 92, respectively. On the other hand, for reverse starting, pairs of adjacent sensor signals are AND-coupled by microcomputer 84 before loading, through the respective OR gates, to current control 48. The magnitude of starting torque is varied by current command $I^*$ which in turn is controlled by speed command $\omega_r^*$ in open-loop manner as indicated in FIG. 7. At transition to feedback control mode, start-up signals $SP_A$, $SP_B$, $SP_C$ and $S_D$ are inhibited and angle control signals $AP_A$, $AP_B$, $AP_C$ and $AP_D$ are provided by angle control 46 to current control 48 through OR gates 86, 88, 90 and 92, respectively, and typically implemented by software in a microprocessor, in a manner well known to those skilled in the art. Output signals $S_A$, $S_B$, $S_C$ and $S_D$ from current control 48 constitute the base drive signals for switching transistors $T_A$, $T_B$, $T_C$ and $T_D$, respectively, of the power converter. Microcomputer 84 may, for example, be an Intel 8751 single-chip microcomputer which can be readily programmed to execute the start-up method of the present invention, and can also advantageously be employed to perform other functions of an overall SRM control.

Figure 8:
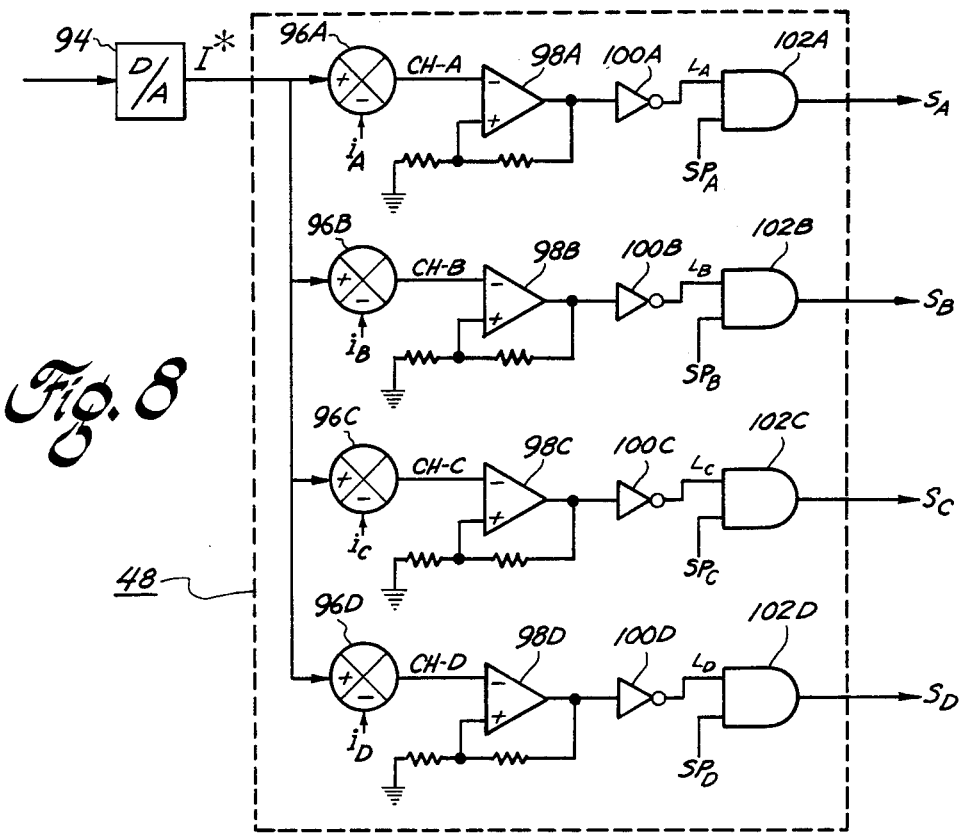
FIG. 8 illustrates a current control useful with the start-up control of the present invention.

A preferred embodiment of current control 48 of the present invention is illustrated in FIG. 8. Current command $I^*$ is converted to an analog signal by digital-to-analog converter 94 and furnished to four parallel-connected channels CH-A, CH-B, CH-C and CH-D. Each of these channels is associated with an individual stator phase and since they all operate identically, only channel CH-A is described herein. Channel CH-A includes a comparator 96A for comparing the current command with actual phase current $i_A$. The current difference output signal from comparator 96A actuates a Schmitt trigger 98A to produce output pulses which are inverted in an inverter 1OOA, resulting in a current magnitude limiting signal $L_A$. AND gate 102A AND-couples limiting signal $L_A$ and start-up pulse $SP_A$, in start-up mode, to produce transistor switching signal $S_A$. Transistor $T_A$ (FIG. 1b) conducts if signal $L_A=1$ and pulse $SP_A=1$. Schmitt trigger 98A in effect creates a hysteresis band about current command I*. The current control maintains actual current amplitude in each stator phase within this hysteresis band, thus acting as a bang-bang controller during start-up. The other channels of current control 48 operate identically to channel CH-A. Together, the four channels provide the switching current signals applied to the transistors of the power converter for start-up.

Figure 9:
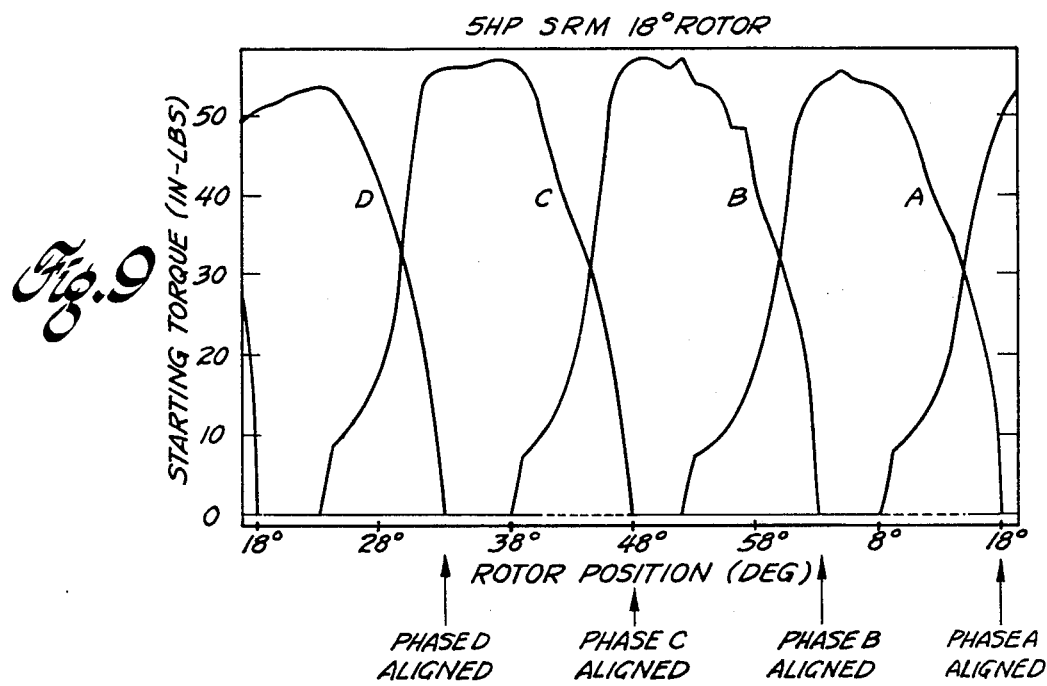
FIG. 9 illustrates measured starting torque as a function of rotor position for each stator phase of a 5 horsepower switched reluctance motor.

FIG. 9 shows the measured starting torque of each stator phase as a function of rotor position for a 5 horsepower switched reluctance motor. The curves deviate from the ideal rectangular shape of 18° with a three degree overlapping because of saturation and fringing effects. The resulting torque can be obtained by summing the components which, obviously, fluctuate with rotor position. The torque curves remain symmetrical for both forward and reverse starting.

Figure 10:
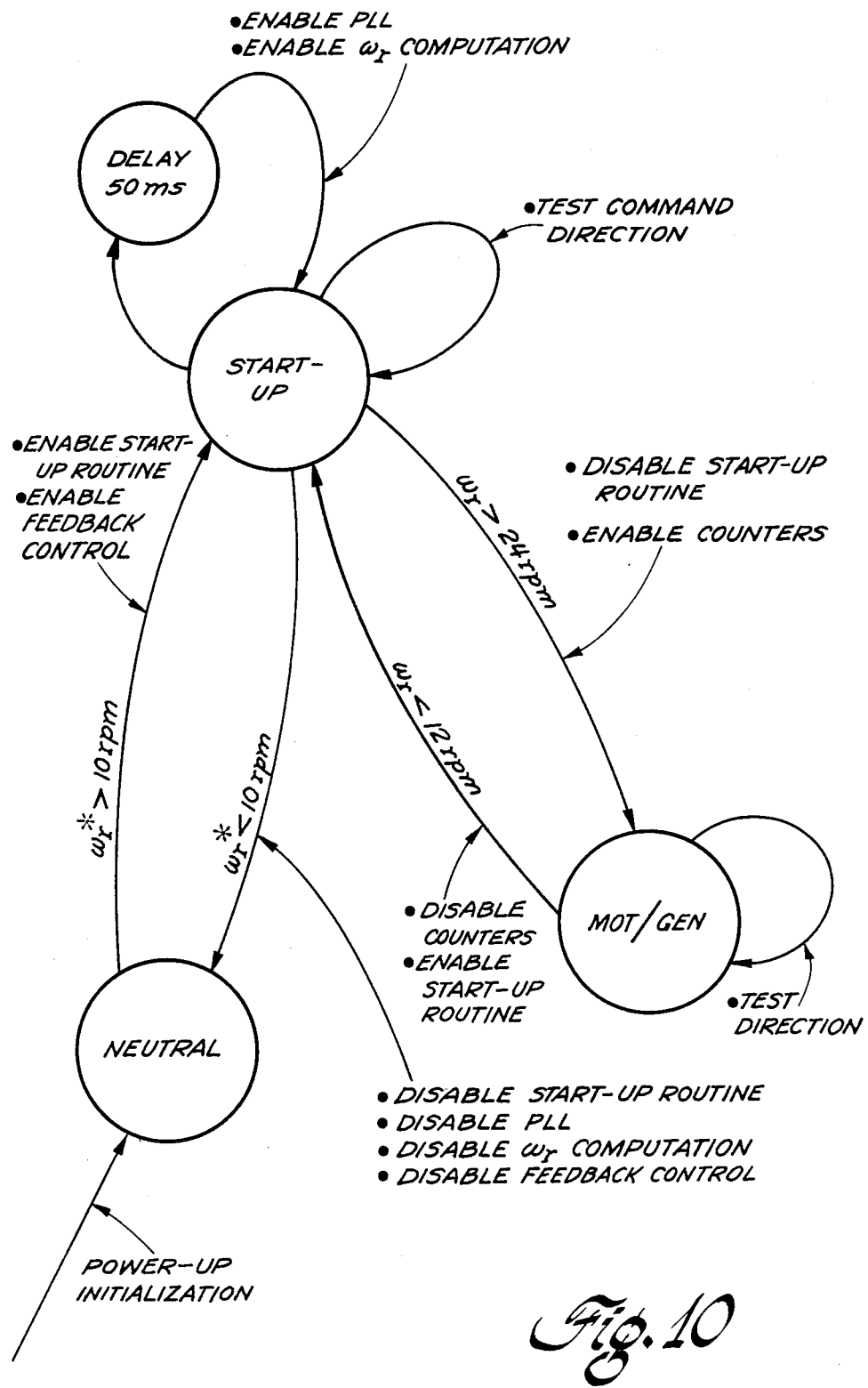
FIG. 10 is a simplified sequence diagram for a switched reluctance motor operating with the start-up control of the present invention.

FIG. 10 shows a complete sequence diagram for start-up, transitioning to motor mode and shut-down of an SRM having a control system incorporating the start-up control of the present invention. The normal running modes (forward motoring, reverse motoring, forward braking and reverse braking) are grouped into the MOT/GE mode. For a successful transition between modes, the conditions as written along the arrows should be valid, then the action routines (identified by dots) are executed before the transition occurs.

The control system initially attains the NEUTRAL mode after power is switched on. The system then transitions to the START-UP mode if the speed command exceeds a threshold value, e.g. 10 rpm. When machine speed builds up (e.g. $\omega_r$ exceeds 24 rpm) the system transitions to a feedback MOT/GEN mode but returns to the START-up mode if the speed falls below 12 rpm. This speed hysteresis band prevents faulty chattering between the modes. A shutdown leading to NEUTRAL state will occur when speed is low (e.g. below 10 rpm) or the operator speed command is withdrawn.

From the foregoing it will be apparent that a start-up control for a switched reluctance motor which satisfies all of the objects of the present invention has been developed. While preferred embodiments of the invention have been shown and described herein, it will be obvious to those skilled in the art that such embodiments are provided by way of example only. Numerous variations, changes, departures, substitutions and partial and full equivalents will now occur to those skilled in the art without departing from the invention. Accordingly, it is intended that the invention be limited only by the spirit and scope of the appended claims.

What is claimed is:

1. A start-up method for starting a multiphase switched reluctance motor in a commanded direction from an initial arbitrary rotor position, the switched reluctance motor including a rotor rotatable in forward and reverse directions within a stator, the rotor having a plurality of rotor poles, the stator having a multiplicity of opposing stator pole pairs, each pair of opposing stator poles sharing a common winding, respectively, and defining a separate stator phase, respectively, the start-up method comprising the steps of:
    determining, for the commanded direction, an inductance profile with respect to rotor angle for each stator pole pair;
    ascertaining the initial rotor position;
    correlating said initial rotor position with the slope of the inductance profile for each respective stator pole pair; and
    firing only stator pole pairs whose inductance profile has a positive slope at the initial rotor position, whereby rotation in the commanded direction is initiated.

2. The start-up method of claim 1 comprising the subsequent steps of;
    ascertaining the instantaneous rotor position;
    correlating said instantaneous rotor position with the slope of the inductance profile for each respective stator pole pair; and
    firing only stator pole pairs whose inductance profile has a positive slope at the instantaneous rotor position.

3. The start-up method of claim 2 further comprising the step of controlling starting torque magnitude by controlling current magnitude in the windings of firing stator pole pairs.

4. The start-up method of claim 3 wherein controlling current magnitude comprises limiting the current magnitude by a bang-bang control.

5. The start-up method of claim 3 wherein, for each of said initial rotor position and instantaneous rotor position, said ascertaining, correlating and firing steps comprise:
    providing a signal from a plurality of optical sensors, each of said sensors being associated with each of said stator pole pairs, respectively, and being located at a predetermined edge of its associated stator pole pair, each of said sensors being illuminated or not illuminated with optical radiation in accordance with the angular position of a rotor position encoder having the same profile as the rotor and being aligned therewith so as to block or allow illumination of said sensors in accordance with the angular position of said encoder; and
    firing only the stator pole pairs respectively associated with each of the nonilluminated sensors during the intervals in which the nonilluminated sensors remain nonilluminated, in order to produce rotor rotation.

6. The start-up method of claim 3 wherein, for each of said initial rotor position and instantaneous rotor position, said ascertaining, correlating and firing steps comprise:
    providing a signal from a plurality of optical sensors, each of said sensors being associated with each of said stator pole pairs, respectively, and being located at a predetermined edge of its associated stator pole pair, each of said sensors being illuminated or not illuminated with optical radiation in accordance with the angular position of a rotor position encoder having the same profile as the rotor and being aligned therewith so as to block or allow illumination of said sensors in accordance with the angular position of said encoder; and
    firing only the stator pole pairs respectively associated with each of the illuminated sensors during the intervals in which the illuminated sensors remain illuminated, in order to produce rotor rotation.

7. The start-up method of claim 5 wherein said predetermined edge comprises the farthest clockwise edge and said rotor rotation occurs in the forward direction.

8. The start-up method of claim 6 wherein said predetermined edge comprises the farthest clockwise edge and said rotor rotation occurs in the reverse direction.

9. The start-up method of claim 7 including the step of producing, from each of said sensors, a respective logic signal during rotor rotation, each said logic signal having a value of zero when the corresponding sensor is interrupted by the disk and a value of one when the sensor is uninterrupted; and complementing the logic signal produced by each of said sensors to determine which stator pole pairs to fire to initiate forward direction rotation.

10. The start-up method of claim 8, including the step of producing, from each of said sensors, a respective logic signal during rotor rotation, each said logic signal having a value of zero when the corresponding sensor is interrupted by the disk and a value of one when the sensor is uninterrupted; and AND-coupling the logic signals from adjacent sensors to determine which stator pole pairs to fire to initiate reverse direction rotation.

11. A start-up control for a multiphase switched reluctance motor which permits initiation of rotor rotation in either a forward or reverse direction, as commanded, from any initial arbitrary rotor position, the motor including a rotor rotatable in forward and reverse directions within a stator, the rotor having a plurality of rotor poles, the stator having a multiplicity of opposed stator pole pairs, each pole pair sharing a common winding, respectively, and defining a separate stator phase, respectively, the start-up control comprising:

rotor position encoder means for generating logic signals equal in number to the stator phases, each of said logic signals being indicative of instantaneous rotor position with respect to a different stator pole pair, said encoder means comprising a respective optical sensor associated with each respective stator pole pair and a rotor position encoder disk mounted to rotate with the rotor, each said respective optical sensor being located near the forward edge of the respective associated stator pole pair, the encoder disk having the same profile as the rotor and being aligned therewith, each said sensor providing a corresponding logic output signal having a logic 1 value when optical energy impinges thereon and a logic 0 value when said optical energy is interrupted by the disk;

start-up signal processing means for receiving and processing the logic signals from said encoder means together with a direction command signal to generate phase-correlated start-up current pulses, said processing means comprising inverter means for complementing the logic output signal of each respective sensor when a forward direction command is received by the signal processing means and coupling means for AND-coupling the logic output signal of each respective sensor with the logic output signal of the respective next-adjacent sensor when a reverse direction command is received by the signal processing means, said inverter means providing said start-up current pulses for forward direction rotation and said coupling means providing said start-up current pulses for reverse direction rotation; and firing means for firing the corresponding stator phases in response to receipt of said phase correlated start-up current pulses.

12. The start-up control of claim 11 further including current control means coupled to said inverter means and said coupling means, for maintaining amplitude of said start-up current pulses within a hysteresis band for a current command.

13. The start-up control of claim 12 further comprising angle control means coupled to said start-up signal processing means for altering said start-up signal processing means at transition from a start-up mode to a feedback control mode.

14. The start-up control of claim 13 wherein said start-up signal processing means includes a programmable microcomputer.

15. The start-up control of claim 14 further including a power supply impressing a DC link voltage across parallel stator windings, each of said windings, respectively, being associated with a different stator phase, respectively, the stator winding of each respective phase being connected to a respective current switching device responsive to start-up current pulses for said respective phase.

16. The start-up control of claim 15 wherein the stator winding of each respective phase is coiled around a respective pair of opposed stator poles.

* * * * *